United States Patent [19]

Friedrich et al.

[11] 4,043,031
[45] Aug. 23, 1977

[54] METHOD OF MANUFACTURING INTERNALLY COOLED HIGH-ENERGY CABLE

[75] Inventors: Jürgen Friedrich; Engelbert Friesenhagen; Werner Rasquin, all of Cologne, Germany

[73] Assignee: Felten & Guilleaume Carlswerk AG, Cologne, Germany

[21] Appl. No.: 592,253

[22] Filed: July 1, 1975

Related U.S. Application Data

[62] Division of Ser. No. 545,036, Jan. 29, 1975, Pat. No. 3,989,884.

[30] Foreign Application Priority Data

Aug. 2, 1974 Germany .......................... 2372790

[51] Int. Cl.² ............................................. H01R 43/02
[52] U.S. Cl. ........................................ 29/628; 29/424; 29/624; 174/15 C; 228/179; 228/187
[58] Field of Search ................ 29/421, 628, 624, 424; 156/48, 53, 54, 49; 228/187, 179, 131; 174/15 C, 126 R, 126 CP, 130, 131 R, 128 R

[56] References Cited

U.S. PATENT DOCUMENTS

| 3,201,507 | 8/1965 | Johnsen .................................. 174/25 |
| 3,332,813 | 7/1967 | Clarke .................................. 29/628 X |
| 3,613,231 | 10/1971 | Pugh .................................. 29/624 |
| 3,649,739 | 3/1972 | Endacott et al. .................. 29/628 X |
| 3,666,879 | 5/1972 | Hirsch et al. .......................... 174/128 |
| 3,667,119 | 6/1972 | Cleaver .................................. 29/628 |
| 3,890,700 | 6/1975 | Diepers .................................. 29/599 |
| 3,895,432 | 7/1975 | Diepers et al. ........................ 29/599 |

FOREIGN PATENT DOCUMENTS

| 622,506 | 6/1961 | Canada .............................. 174/15 C |
| 832,312 | 4/1960 | United Kingdom .............. 174/15 C |
| 404,245 | 1/1934 | United Kingdom .............. 174/15 C |

*Primary Examiner*—Victor A. DiPalma
*Attorney, Agent, or Firm*—Michael J. Striker

[57] ABSTRACT

A cable includes a tubular multi-layer electric conductor, electric insulation surrounding the electric conductor, and an outer cable jacket surrounding the electric insulation. An inner tubular member of titanium or alloyed stainless steel is accommodated in the electric conductor and defines a channel for a cooling medium such as water. At least one of the layers constituting the electric conductor is a circumferentially complete tubular element surrounding or surrounded by a layer comprising a plurality of juxtaposed elongated electric conductor elements. In the region of contact of the electric conductor with the inner tubular member, there is provided at least one groove extending longitudinally of the cable for conducting the cooling medium which escapes from the cooling channel in case of damage to the inner tubular member to the ends of the cable so as to indicate the occurrence of such damage. A method of manufacturing such cable includes shrinking the electric conductor on the inner tubular member, joining a plurality of the inner tubular members by welding at a high temperature, and subsequently joining the electric conductors surrounding the inner tubular members by welding at a lower temperature.

7 Claims, 4 Drawing Figures

METHOD OF MANUFACTURING INTERNALLY COOLED HIGH-ENERGY CABLE

BACKGROUND OF THE INVENTION

This is a division, of application Ser. No. 545,036, filed Jan. 29, 1975 now U.S. Pat. No. 3,989,884.

The present invention relates to an internally cooled high-energy cable, and more particularly to a water-cooled high-voltage high-energy cable having a closed internal cooling channel.

There are already known high-energy cables including a plurality of radially superimposed layers of various properties which surround one another and an internal cooling channel. For transmitting energies in the order of 2000 MVA, it is already known to provide a cable which is formed with an internal cooling channel bounded by the electric conductor itself. Experience with this type of cable has shown that for the electric conductor of aluminum the diameter of the cooling channel should be greater than 60 millimeters, particularly equal to or exceeding 70 millimeters.

It is also already known to use water as the cooling medium for internally cooling the high-energy cable. However, many problems are encountered when water is used as the cooling medium. So, for instance, when the cooling channel is bounded by the electric conductor itself as mentioned above, that is when the innermost layer of the cable is of a material having high electric conductivity, such as aluminum, there exists the danger that the electric conductor will be attacked by the cooling medium, that is cooling water, and will corrode over a period of time until the cable is rendered useless.

Further difficulties are encountered when the electric conductor is constituted by a plurality of layers, some of which are circumferentially complete tubular electric conductors and some of which are constituted by layers or segments of elongated electrically conductive elements which surround or are surrounded by the tubular electric conductors. Such a multi-layer construction of the electric conductor is often necessary, particularly where, as in the present case, the thickness of the electric conductor in the radial direction of the cable is substantial, in order to permit bending of the electric conductor during the manufacture, transportation and laying of the cable. The difficulties arising from such a construction are particularly pronounced when the elongated electrically conductive elements are of the same material as the tubular electric conductor. Namely, only a certain length of the cable can be transported to the point of use, and the cable is usually assembled from a plurality of such lengths in situ by welding the end portions of such lengths to one another. During the welding, the inner tubular elements are welded to one another first, with the elongated electrically conductive elements removed from the region of welding, and then another welding operation is performed for connecting the elongated electrically conductive elements of the adjacent lengths of the cable to one another to form the superimposed layer of the electric conductor which surrounds the inner tubular electric conductor. It will be appreciated that, during the second welding operation, the previously manufactured welded connection of the two adjacent tubular electric conductors will be reheated to the welding temperature, that is to a temperature which at least plasticizes the material of the welded connection of the tubular electric conductors. As a result of this reheating of the welded connection, the quality thereof in most instances suffers, so that it is impossible or at least very difficult to assure a faultless water-tight connection between the two inner tubular electric conductors.

Another aspect to be taken into consideration when manufacturing such cables is that the materials of the various layers of the electric conductor must be so selected that the danger of electric interaction of these materials is kept to the minimum. More particularly, the electric potentials of these materials must be as close to each other as possible so as to prevent or minimize damage to the electric conductor resulting from these materials acting as an electric cell. The same consideration is also valid for the characteristic properties of the other members of the cable and its connecting arrangements which come into contact with the cooling medium.

In the above-mentioned electric cables, there also exists the danger that, due to the relatively low resistance to wear on the electric conductor bounding the cooling channel through which the cooling water or similar cooling fluid flows at relatively high speeds, the erosion of the internal surface of the electric conductor will be relatively high which will render the electric cable of the prior art useless within a relatively short period of time, especially after the cooling fluid starts leaking through the electric conductor.

SUMMARY OF THE INVENTION

Accordingly, it is an object of the present invention to avoid the above-discussed disadvantages of the prior art cables.

It is a further object of the present invention to present a reliable, corrosion and erosion resistant cable of the type where cooling medium such as water flows through the interior of the cable.

It is yet another object of the present invention to provide a water-cooled cable in which the electric conductor is of a multi-layer configuration, surrounds the cooling channel for the cooling medium, and is in turn surrounded by an insulation and other protective layers.

It is still another object of the present invention to so construct a multi-layer electric cable that the layer immediately bounding the cooling channel is of a material which plasticizes at a higher temperature than that needed for welding the electric conductor, and which does not act as an electric cell with the material of the electric conductor.

It is a concomitant object of the present invention to devise a method of manufacturing such a cable.

Yet more particularly, it is an object of the present invention to provide a method for manufacturing such a cable in such a manner that the consecutive lengths of the cable which together constitute the cable are sealingly connected to one another.

Another object of the present invention is to provide a flexible cable which can be wound up on reels both during the manufacture and the transportation thereof, without adversely affecting the circular cross-section thereof.

In pursuance of these objects and others which will become apparent hereafter, one feature of the present invention resides, briefly stated, in providing a tubular member of corrosion-resistant metallic material having a welding temperature higher than that of the electric conductor, inside the latter, so as to define a channel for the passage of the cooling medium such as water therethrough. The inner tubular member may be of stainless steel or titanium, as a result of which the corrosion of the inner tubular member is for all intents and purposes avoided. Consequently, it is achieved that the cooling medium or cooling water is effectively separated from the electric conductor for the entire life span of the electric cable which may and should amount to about 40 years.

When stainless steel — afterwards referred to as alloyed steel — is used for the inner tubular member, it is relatively unimportant which other metallic materials are used in the continuation of the cooling circuit since it is well known that copper and alloyed steel on the one hand, or aluminum and alloyed steel on the other hand, can be combined without encountering any difficulties. As a result of this possible combination of other materials with the alloyed steel inner tubular member, it is currently preferred to make the current-receiving arrangement located at the end of the water-cooled high-voltage high-energy cable of copper, so that a sufficient degree of cooling action is obtained also for this current-receiving arrangement where the cooling effect of the cooling water is no longer available for cooling the different distributor wires or cables. In addition thereto, it is also possible to make the connections between the electric conductor and the distributor wires as well as between the individual elongated electrically conducting elements of copper in a simple, reliable and relatively inexpensive manner.

It is proposed according to the present invention to connect the consecutive lengths of the cable by welding and/or soldering. Thus, the associated end portions of the consecutive inner tubular members may be welded to one another after the electric conductor has been removed or offset in the immediate region of the welded connection. As a result of the accessibility of the region where the welded connection is to be produced, it is possible to manufacture an excellent welded connection of any two adjacent inner tubular members defining the cooling channel, and to subsequently examine the welded connection for possible flaws which can be immediately corrected. Once the result of the examination indicates that the welded connection of the particular inner tubular members is flawless, it is possible to connect the surrounding electric conductor by welding or soldering without impairing the quality of the welded connection of the inner tubular members. This is possible due to the fact that the temperature used during the welding or soldering operation for interconnecting the electric conductors of any two consecutive cables is substantially lower than the temperature needed for welding the inner tubular members, so that the heat transmitted to the previously produced welded connection of the inner tubular members does not result in plastification of the material of the inner tubular members or the connection thereof.

In view of the fact that the inner tubular member of alloyed steel must be wound up on reels and removed therefrom several times during the manufacture of the high-voltage high-energy cable, and that the alloyed steel tubular member possesses a much higher resistance to bending than a comparable aluminum tubular member, it is quite possible that during such winding-up and removing operations the cross-section of the tubular member could change from circular to oval. This, of course, is very undesirable since such change would result in an increase of the resistance to the flow of the cooling medium through the tubular member at the very least, but it could also result in damaging the inner tubular member. Therefore, in accordance with a further feature of the invention, it is proposed that the wall thickness of the inner tubular member for conducting the cooling medium be selected between approximately 2 and 3.6 millimeters when the inner tubular member is of alloyed steel. Under these circumstances, namely, when the wall thickness of the inner tubular member is within the above range, it is possible to bend the tubular member several times without incurring any appreciable changes in the dimensions thereof. Thus, the inner tubular member, whether or not incorporated in the cable, may be taken up on and removed from a reel several times between the production thereof and the laying of the cable. However, it is to be mentioned that the diameter of the core of the reel on which the inner tubular member or the cable is taken up should be in the vicinity of 3.5 meters.

In the currently preferred embodiment of the invention, the electric conductor includes a plurality of elongated electrically conductive elements which are radially superimposed on the inner tubular member, particularly twisted about the same in layers or in segments. It is also currently preferred that the electric conductor further includes a metallic tubular member immediately surrounding the elongated electrically conductive elements, such as an aluminum tube. A twofold advantage is achieved by this particular construction of the electric conductor. First of all, the circumferentially complete metallic tubular member surrounds the elongated electrically conductive elements in such a manner that it separates the latter from the electric insulation which circumferentially surrounds the metallic tubular member. Thus, in the event that the inner tubular member develops a crack or otherwise permits the cooling medium to enter the electric conductor, the outer metallic member prevents such leakage cooling medium from entering and damaging the electric insulation. On the other hand, the escaped cooling medium will propagate along the twisted individual electrically conductive elements until it reaches one or both ends of the cable so that, when a periodic inspection of these ends reveals the presence of water, escaping from the cable, outside the cooling channel, this will indicate the perforation of the inner tubular member somewhere between the ends of the cable.

Since the outer metallic tubular member completely surrounds the elongated electrically conductive elements, a further advantage is obtained. Namely, it is not necessary to perform the twisting operation of the electrically conductive elements with an extreme degree of care, since the outer tubular member provides a smooth outer surface in contact with the electric insulation regardless of any imperfections of the electrically conductive elements themselves or the twisting thereof about the inner tubular member. Thus, even the remainders from the various cutting or other operations performed on the elongated electrically conductive elements are effectively separated from the electric insulation by the presence of the outer metallic tubular member which surrounds the electrically conductive elements.

In a further currently preferred embodiment of the invention, an additional layer of electrically conductive elements is radially superimposed on the outer tubular member, preferably of aluminum. The advantage obtained by this construction resides in the fact that this additional layer absorbs the outer deformation forces which would otherwise act on the outer metallic tubular member, so that formation of wrinkles or folds on the outer tubular member during the handling thereof or of the finished cable, such as repeated winding and unwinding thereof, is effectively prevented.

A further advantageous embodiment of the present invention employs a tubular electric conductor of aluminum about which at least one layer of trapezoidal electrically conductive elements is twisted. The advantage obtained by this particular construction of the electric conductor of the cable is that it is possible to manufacture the electric conductor at a lower expense both in terms of material and labor than an electric conductor produced from and consisting of a plurality of layers of twisted elements or wires. This, of course, is achieved without sacrificing a very important advantage of the latter arrangement which resides in the fact that the plurality of the electrically conductive elements twisted about the tubular member provide for an elastically yieldable contact with the electric insulation. Moreover, the provision of the electrically conductive elements which are twisted about the tubular aluminum conductor results in filling of the cross section of the electric conductor without simultaneously significantly increasing the resistance of the electric conductor to bending.

In order to obtain even in the above-discussed embodiment of the invention the advantage discussed previously of readily ascertaining the presence of a leak in the inner tubular member, which would otherwise be impossible because of the immediate contact of the tubular electric conductor with the inner tubular member, that is in order to allow the leakage cooling medium to progress along the electric conductor longitudinally of the cable towards the exposed ends thereof, without the cooling medium penetrating through the tubular conductor and reaching the electrically conductive elements, it is proposed in accordance with a further embodiment of the invention to form at least one, but preferably a plurality of, grooves in the region of contact of the tubular electric conductor with the inner tubular member, which grooves extend longitudinally of the cable. Thus, for instance, it is advantageous to provide such grooves at the inner circumferential surface of the tubular electric conductor. However, it is also possible to provide such grooves at the outer circumferential surface of the inner tubular member which defines the cooling channel, for instance in a milling operation or during the manufacture of the inner tubular member by extrusion by properly designing the extrusion dies. Whichever method of producing the grooves in the inner tubular member is utilized, any excessive weakening of the walls of the inner tubular member must be avoided.

The present invention is further directed to a method of manufacturing of an internally cooled, particularly water-cooled, high-voltage high-energy cable of the above discussed type. The method according to the invention includes the operation of shrinking the tubular electric conductor upon the inner tubular member for the cooling medium, for instance in an extrusion press, and the subsequent operations of twisting a layer of trapezoidal electrically conductive elements about the tubular electric conductor, such elements being of aluminum, of surrounding such layer with an electric insulation, and of surrounding the latter with a cable jacket. The shrinking of the electric conductor upon the inner tubular member results in tensile stresses in the former, which stresses in turn prevent formation of folds in the inner tubular member when the assembly is bent about small bending cores in course of the further handling thereof. A further advantage of the shrinking of the electric conductor upon the inner tubular member is that the different thermal behaviors of the two materials of which the two tubular members are made, for instance steel and aluminum, do not adversely affect the transmission of heat from the electric conductor to the inner tubular member. More particularly, despite the different thermal expansion coefficients of these materials, no gap develops between the inner tubular member and the tubular electric conductor which would otherwise be expected, so that under all circumstances an excellent thermal contact is obtained between the outer surface of the inner tubular member for the cooling medium which is of, for instance, alloyed steel, and the inner surface of the tubular electric conductor which may be, for example, of aluminum, so that local overheating is avoided.

According to a different aspect of the method of manufacturing the internally cooled high-voltage high-energy cable, it is currently preferred in accordance with the present invention to subject the corrosion-resistant inner tubular member for the cooling medium to an internal overpressure. This elevated pressure may be obtained, for instance, by means of a pressure fluid. As a result of this elevated pressure existing in the interior of the cooling medium inner tubular member of, for instance, alloyed steel, it is achieved that the deformation of the inner tubular tubular member during the manufacturing operation, particularly the change of the circular cross section of the cooling channel to an oval cross section, is avoided even if the inner tubular member is bent about relatively small bending cores and even if the thickness of the wall of the inner tubular member is relatively low, for instance, approximately 1.5 millimeters. To be secure, it may be advantageous if, regardless of the particular wall thickness of the alloyed steel inner tubular member, the inner positive pressure is maintained inside the alloyed steel inner tubular member at least while the inner tubular member of alloyed steel is taken up and removed from the wind-up reel, whether the inner tubular member is already surrounded by the cable jacket or not. Consequently, in accordance with this feature of the present invention, the inner tubular member will be subjected to the elevated internal pressure even when it is already incorporated into the finished cable and when the latter is unwound from the take-up reel on which it has been transported to the particular location of use and laid into the ground ditch.

The cable according to the present invention is assembled and connected from a plurality of consecutive lengths of the above-discussed cable. Each of such lengths of cable has the above-mentioned configuration and layered construction, and the end portions of any two consecutive lengths of the cable are connected to one another by welding the respective inner tubular members for conducting the cooling medium, to one another, and by welding or soldering the electric conductor end portions to one another. The presence of the welded connections would prevent the propagation of the leakage medium longitudinally of the cable toward the ends thereof, unless the construction is so modified as to provide for the communication of the grooves of the consecutive lengths of cable with one another. This is achieved in accordance with an additional feature of the present invention by inserting tubes into the leakage-medium-conducting grooves prior to the welding operation, which tubes extend into the grooves to a sufficient extent so as not to be clogged during the welding operation. The tubes must be of a material of a significantly higher melting temperature than the electric conductor, and preferably of the same material as the inner tubular member. After the electric conductor has been welded, these tubes establish communication between the associated grooves of the consecutive lengths of the cable, the interior of such tubes not having been obstructed during the welding operation.

The advantage of the propagation of the leakage medium to the ends of the cable may be seen in the fact that the appearance of the leakage medium at the end of the cable is indicative of the occurrence of a leak somewhere along the cable. However, this is still insufficient for determining where such a leak occurred. Thus, it is necessary to find out the exact location of the leak in order to be able to repair or replace the affected length or section of the cable. The exact location of the leak can be determined according to a different feature of the invention by introducing into the inner tubular member a go-devil or swab element secured to a rope which is provided with markings at predetermined intervals. The cooling medium is introduced into the inner tubular member behind the go-devil and it propels the latter through the inner tubular member. As long as the go-devil is situated upstream of the location of the leak, no leakage fluid will appear on or flow from the ends of the cable since the fluid cannot pass forwardly of the go-devil. However, once the go-devil passes the location of the leak, the cooling fluid will leak into the grooves and appear at the ends of the cable. The markings on the rope then indicate the distance of the leak from the point of introducing the go-devil. The go-devil used for determining the leak may be of a conventional configuration, such as disclosed in a Swiss Pat. No. 583,769, such go-devils being usually used for drawing an auxiliary rope in a cable tube. Thus, such go-devils are especially suited for the use according to the present invention, since they establish a sealing contact with the interior surface of the inner tubular member, which in the usual application is necessary for propelling the go-devil through the cable tube by pressurized air, which actually corresponds to the propelling of the go-devil through the inner tubular member using the cooling medium which builds up its pressure behind the go-devil.

The novel features which are considered as characteristic for the invention are set forth in particular in the appended claims. The invention itself, however, both as to its construction and its method of operation, together, with additional objects of the advantages thereof, will be best understood for the following description of specific embodiments when read in connection with the accompanying drawings.

DETAILED DESCRIPTION OF THE PREFERRED EMBODIMENTS

Figure 1:
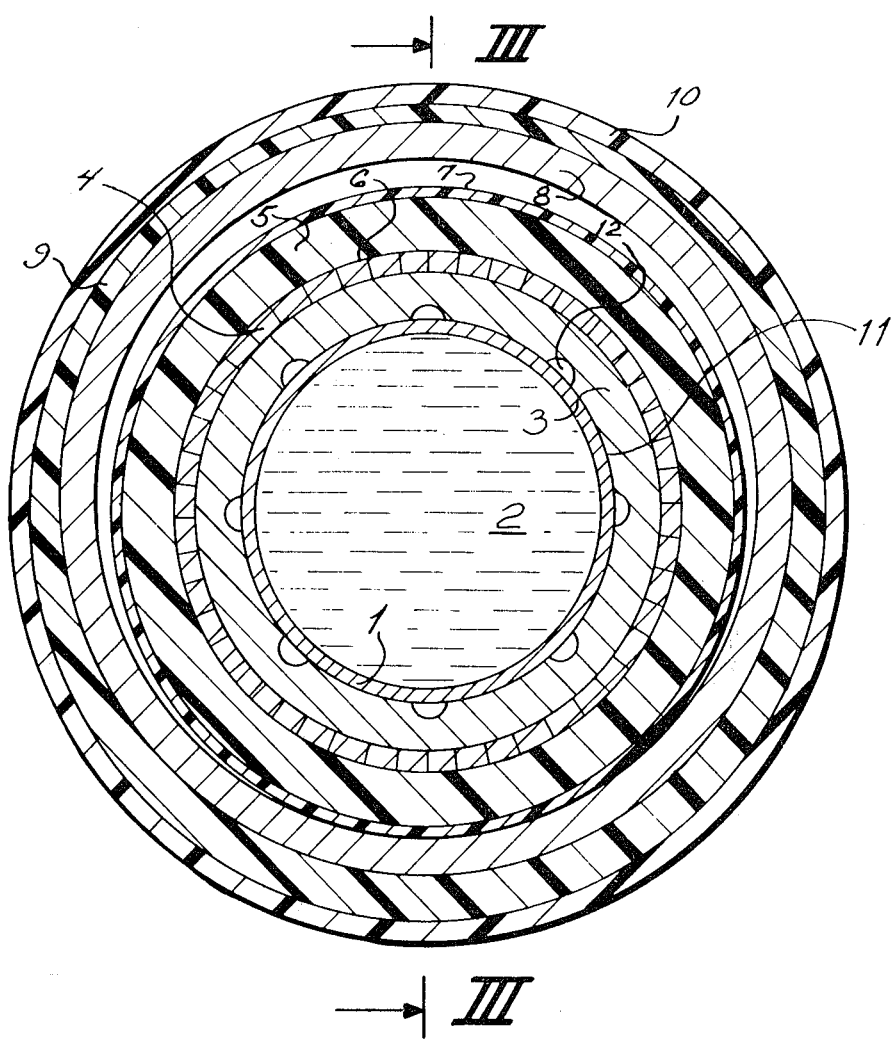
FIG. 1 is a cross-sectional view of a cable according to a first embodiment of the invention utilizing a tubular electric conductor.

Referring now to the drawings, and first to FIG. 1 thereof, it will be seen that the high-voltage high-energy electric cable according to the present invention which is provided with internal cooling includes an inner tubular member 1 for passage of the cooling medium, such as cooling water 2 therethrough. The member 1 may be of a corrosion and erosion resistant material, such as alloyed steel. An aluminum tube 3, which serves as an electric conductor, is shrunk on the cooling medium-conducting inner tubular member 1, and at least one layer of trapezoidal aluminum elongated electrically conductive elements 4 is twisted about the outer circumference of the aluminum tube 3. These trapezoidal elements 4 supplement the conducting cross section of the aluminum tube 3 which serves as the electric conductor, and simultaneously establish an elastically yieldable contact with an electric insulation 5. The latter may be, for instance, an oilpaper insulation. A conductor shielding 6 is interposed between the electric insulation 5 and the layer including the elongated electrically conductive elements 4 and serves the purpose of preventing the electric field increase. The cable core, which is constituted by the alloyed steel tube 1, the electric conductor which includes the aluminum tube 3 and the aluminum elements 4, the conductor shielding 6 and the electric insulation 5, is surrounded by an electric shielding 7, and it is drawn into a corrugated tube 8 which may be of aluminum, for instance. A plastic layer 9 and a PVC coating 10 are provided on the outer circumference of the corrugated aluminum tube 8 in order to protect the latter from corrosion and mechanical damage.

As far as the configuration and arrangement of the electric conductor are concerned, which latter is in this instance assembled from the aluminum tube 3 and the layer of aluminum elements or wires 4, it is to be mentioned that such an electric conductor should have a large electrically active cross section in order to permit passage of a highest obtainable electric current therethrough. For transmitting approximately 2000 MVA, the radial thickness of the electric conductor should be approximately 15 millimeters or more and the effective conductive cross section at least 3,200 square millimeters when aluminum is used as the material of the electric conductor, and the diameter of the cooling channel for the cooling medium should be at least 60 millimeters, preferably equal to or greater than 70 millimeters. In the cable construction according to the present invention, the aluminum tube 3 is shrunk upon the alloyed steel tube 1 so that a good thermal contact exists between the alloyed steel tube 1 and the aluminum tube 3 at any location of the cable, regardless of the temperatures of the particular layers of the multi-layered construction of the cable, whereby overheating of some regions of the cable is avoided.

In order to be able to detect the occurrence of a crack or fissure in the inner tubular member 1 by permitting the leakage cooling medium to propagate to the ends of the cable, an inner surface 11 of the aluminum tube 3 is formed with grooves 12 which extend in parallelism with the axis of the cable.

Figure 2:
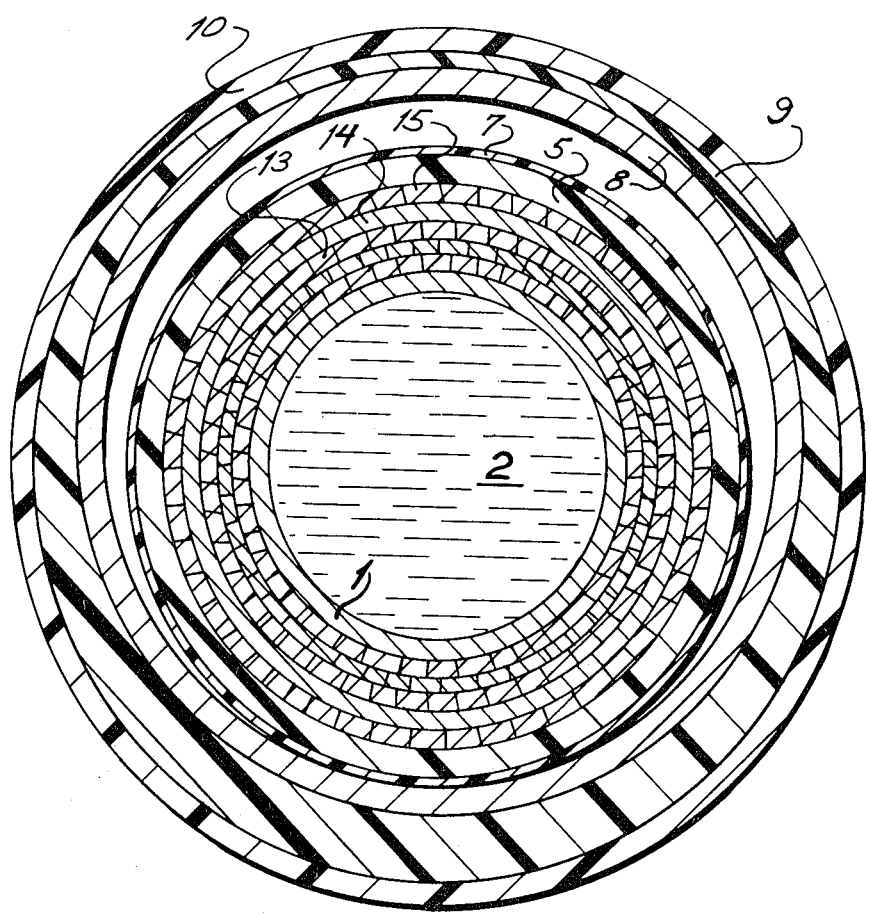
FIG. 2 is a cross-sectional view of a cable according to a second embodiment of the invention utilizing an electric conductor including a plurality of twisted electrically conductive elements.

In the embodiment illustrated in FIG. 2, the electric conductor includes aluminum elements or wires 13 which are twisted about or otherwise superimposed upon the cooling medium tube 1 in three layers. A metallic, for example, aluminum, tube 14 is pressed on the outermost layer of the elements 13, and is in turn surrounded by pressure-protecting wires 15.

Figure 3:
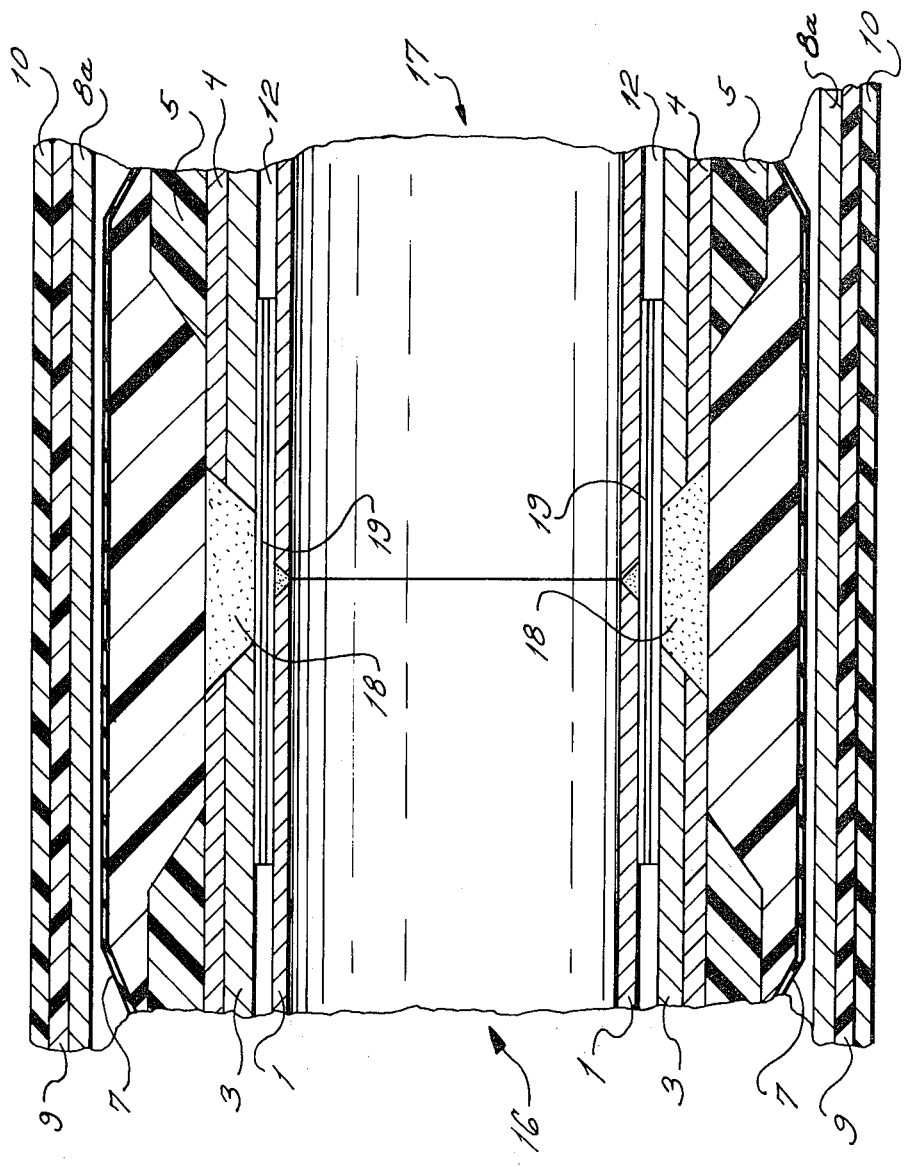
FIG. 3 is a longitudinal section taken on line III—III of FIG. 1.

It may be seen from FIG. 3 that the individual lengths 16, 17 of the cable according to the present invention are connected by welding the juxtaposed ends of the cooling medium tubes 1 and of the electric conductors, that is the aluminum tubes 3 and the elongated electrically conductive elements 4, to one another, respectively. The reference numeral 18 indicates the welded connection. A tube 19 is inserted into the respectively associated grooves 12 and pass 20 through the welded connection 18 so as to establish communication between the grooves 12. Radially outwardly of the welded connection 18, the electric insulation 5 is conically offset, and a conventional sleevewound insulation takes its place. In addition thereto, the corrugated tube 8 is replaced in the region of the welded connection 18 by a cylindrical piece 8a.

In the event that the electrical conductor mainly includes the elongated electrically conductive elements 13 as illustrated in FIG. 2, then the tubes 19 are inserted into the gaps between the indiviual elements 13 so that here again communication is established for the leakage medium between the consecutive lengths of the cable and through the welded connection.

Figure 3A:
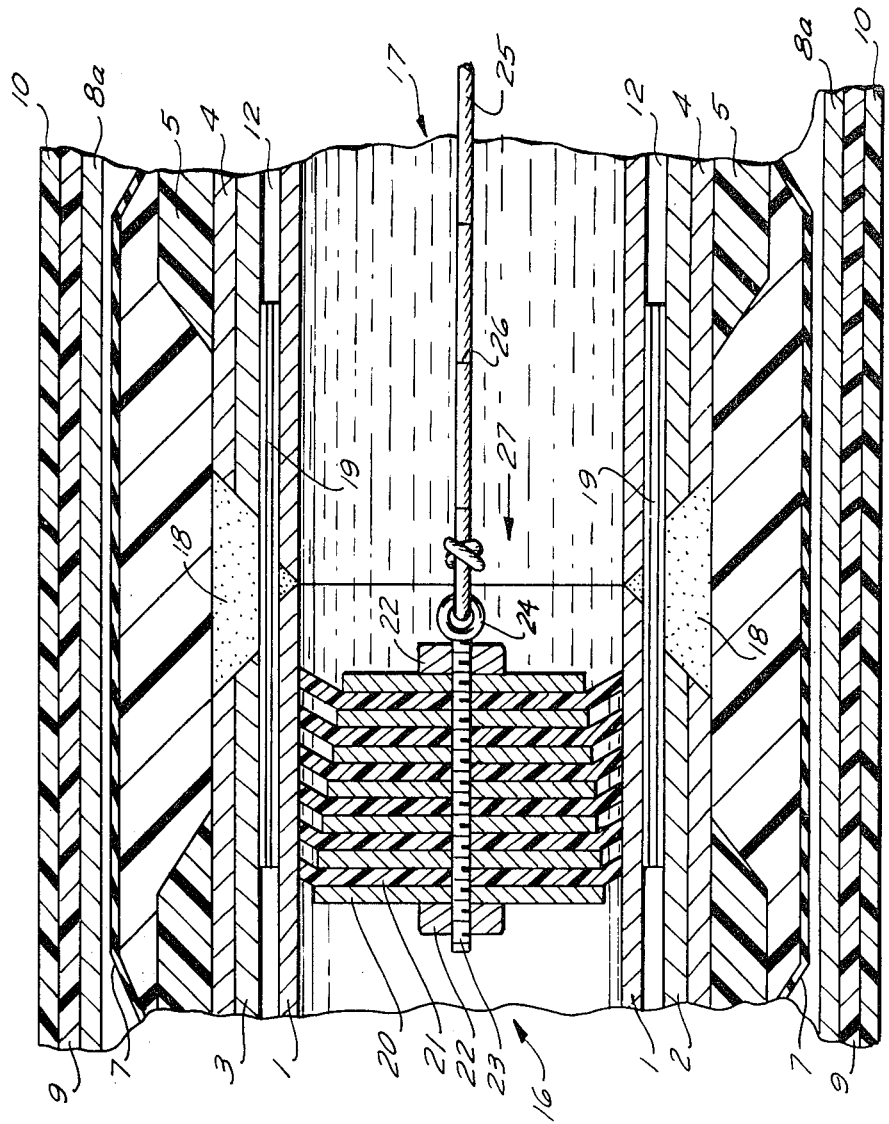
FIG. 3a is a view similar to FIG. 3 and showing a go-devil in its position for determining the location of a leak.

FIG. 3a is a view similar to FIG. 3 and, illustrates an example of a go-devil which may be used for performing the method of determining the location of a leak in the cable. The go-devil is constituted by a plurality of annular disks 20 which alternate with sealing members 21 in the axial direction of the cable. A connecting rod 23 which is formed with an eyelet 24 extends through the disks 20 and the sealing members 21, and nuts 22 are threaded thereon and fix the positions of the disks 20 and members 21 on the rod 13. A rope 25 which is provided with markings 26 indicating the length of the rope 26 is connected to the eyelet 24.

When the location of a leak in the cable is to be determined, the go-devil is introduced into the cable, after the rope 25 has been tied to the eyelet 24, and a fluid is introduced into the cable behind the go-devil. The pressure of the liquid forces the go-devil in the direction of the arrow 27 so that the rope 25 with the markings 26 is pulled into the cable. Once the go-devil passes the location of a leak, the fluid will penetrate into the grooves 12 and appear at the ends of the cable, so that the distance of the leak from the point of introducing the go-devil can be determined by reference to the markings 26.

The method of manufacturing the cable according to the invention differentiates from the conventional methods of producing high-voltage high-energy cables mainly in that it must be assured that no changes occur in the cross-section of the inner tubular member 1 which is of alloyed steel or titanium, particularly that the cross-section of the inner tubular section does not change from circular to oval, and that no folds develop on the relatively thin-walled inner tubular member as the same either alone or in combination with the other layers of the multi-layered cable is repeatedly wound up on, and payed out from, various reels during the manufacture of the cable, such as prior to the shrinking of the aluminum tube 3 upon the tube 1, to the twisting of the aluminum elements 4 about the tube 3, the superimposition of the electric insulation 5 and so on. In order to avoid such deformations, it is currently preferred that the method of the present invention includes the step of introducing a pressurized medium, such as a pressurized liquid, into the interior of the inner tubular member 1 so as to provide a pressure differential across the wall of the inner tubular member 1 which counteracts the external pressure acting on the inner tubular member 1 when the same or the cable in various stages of its manufacture is bent. Since, as already mentioned, such external forces only occur when the inner tubular member 1 or the cable are wound up on, or payed out from, the take-up reels during the production of the cable or the laying of the same it is sufficient if the inner tubular member 1 is pressurized only during such winding and unwinding operations.

It will be understood that each of the elements described above, or two or more together, may also find a useful application in other types of cable differing from the types described above.

While the invention has been illustrated and described as embodied in high-voltage high-energy cables, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. A method of manufacturing a high-voltage high-energy cable of a plurality of cable lengths, comprising the steps of providing an inner tubular member of metallic corrosion-resistant material for each of the cable lengths; providing an elongated blank member of metallic electrically conductive material for each of the cable lengths; forming one of said members with at least one longitudinally extending groove in the region of one surface thereof; mechanically shrinking said blank member around said tubular member so that said one surface comes into contact with the other member and said blank member forms a tubular element around said tubular member, said groove being located at the interface between said tubular element and said tubular member; winding a plurality of elongated trapezoid elements around said tubular element to obtain a cable length core; insulating and sheathing said core to obtain a cable length; juxtaposing end portions of respective cable lengths with one another so that said grooves of said cable lengths are aligned with one another; inserting end portions of a tube of highly temperature-resistant material into said grooves of said cable lengths so as to establish communication between said grooves across the interface between said end portions of said cable lengths; and connecting said end portions of said cable lengths to one another.

2. A method as defined in claim 1, wherein said connecting step includes welding said inner tubular members of said cable lengths to one another, and subsequent welding of said tubular elements and said trapezoid elements of said cable lengths to one another.

3. A method of manufacturing a high-voltage high-energy cable which is internally cooled by a cooling medium flowing through a cooling channel, comprising the steps of providing an inner tubular member, which bounds the cooling channel, of metallic corrosion-resistant material; providing an elongated blank member of metallic electrically conductive material; forming one of said members with at least one longitudinally extending groove in the region of a contact surface thereof; shaping a tubular component around said inner tubular member to constitute a cable length core therewith, including deforming said blank member to form an outer tubular member around said inner tubular member so that said contact surface of said one member comes into contact with the other member and said groove constitutes a passage at the interface between said tubular members for receiving cooling medium which penetrates through said inner tubular member in the event of damage thereto and for conducting such leakage cooling medium longitudinally of said cable length to respective end portions thereof to indicate occurrence of such damage thereat; insulating and sheathing said cable length core to obtain a cable length; juxtaposing an end portion of said cable length with an end portion of a similar cable length; and inserting end portions of a tube of highly temperature-resistant material into the associated grooves of said cable length and additional cable length so as to establish communication between the same.

4. A method as defined in claim 3, wherein said shaping step includes mechanically shrinking a tubular element around said inner tubular member, and winding a plurality of elongated trapezoid elements around said tubular element.

5. A method as defined in claim 4, and further comprising the steps of welding the inner tubular members of said cable length and additional cable length to one another and welding the tubular elements and the trapezoid elements of said cable length and additional cable length to one another subsequently to said insertion step.

6. A method as defined in claim 3, and further comprising the step of subjecting said inner tubular member to an internal positive pressure during the manufacture of the cable.

7. A method as defined in claim 6, wherein said subjecting step is performed at least while said inner tubular member is subjected to bending during the manufacture of said cable.

* * * * *